INVENTOR.
ANDRE R. BRAULT
BY

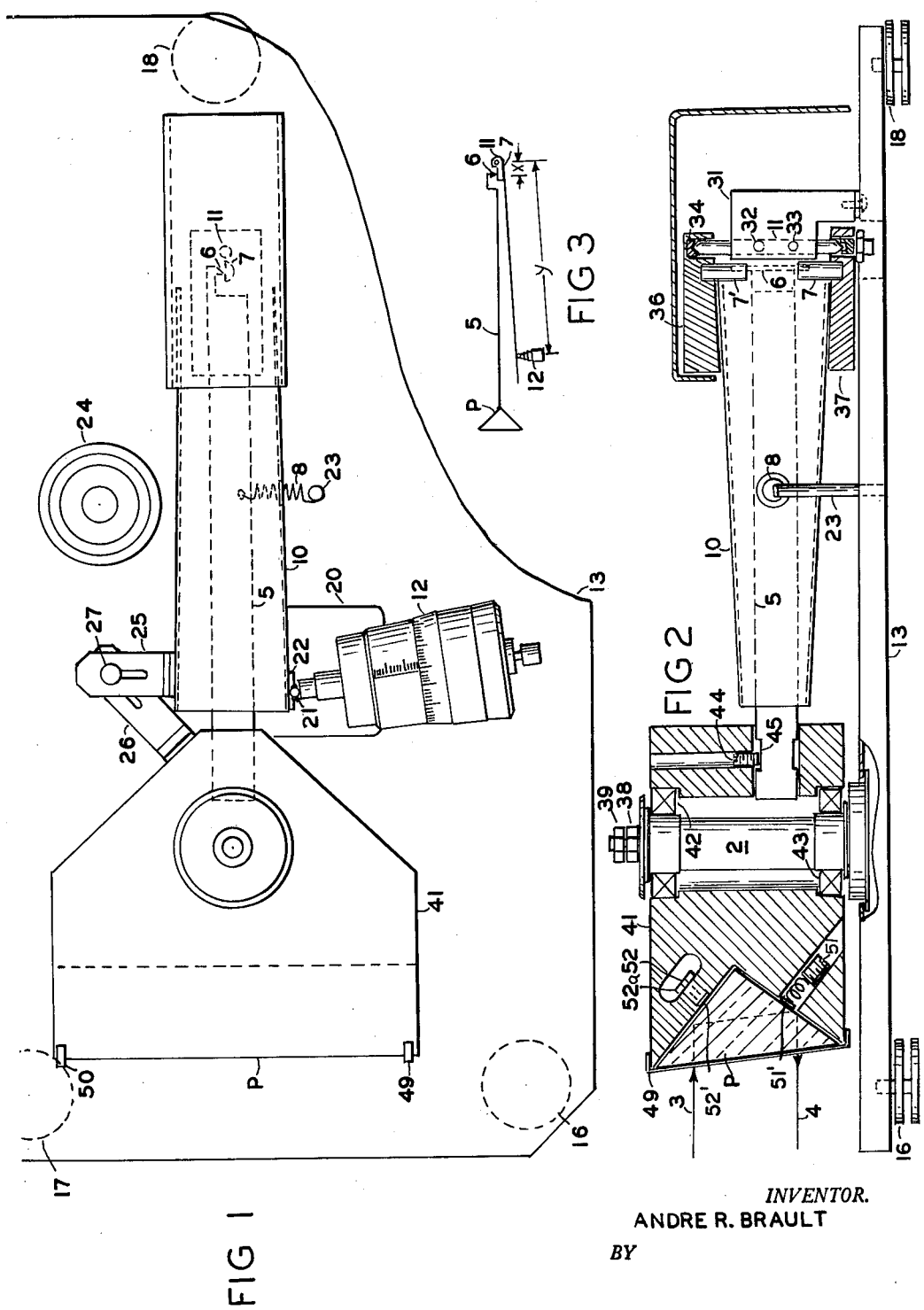
Oct. 2, 1962 — A. R. BRAULT — 3,056,207
OPTICAL MEASURING MEANS
Filed Aug. 22, 1960 — 2 Sheets-Sheet 1
INVENTOR.
ANDRE R. BRAULT
BY Oct. 2, 1962 A. R. BRAULT 3,056,207
OPTICAL MEASURING MEANS
Filed Aug. 22, 1960 2 Sheets-Sheet 2

3,056,207
OPTICAL MEASURING MEANS
Andre R. Brault, North Merrick, N.Y., assignor to Optomechanisms, Inc., Mineola, N.Y.
Filed Aug. 22, 1960, Ser. No. 50,893
1 Claim. (Cl. 33—72)

This invention relates to optical measuring means and more particularly to means for measuring very small angles with very great accuracy.

More specifically the invention provides means to calibrate optical instruments, guidance systems, radiant energy apparatus and precision mechanical devices for collimation or other small angular deviations or corrections.

The present invention provides means for measuring angles of a few seconds or fractions thereof or minutes and provides a micrometer adjustment having one micrometer division for every 1/10 second of angle with an accuracy of .25 second R.M.S. The present device is made compact enough for field use by means of a parallel lever linkage mounted on precision miniature bearings.

More specifically the present invention comprises a 90° prism adapted to receive and reflect optically parallel rays. The prism is mounted for angular horizontal rotation around a vertical axis. A long bar is fixedly connected to the prism and extends rearwardly along the horizontal axis of the prism and terminates in a knife edge bearing against a motion reducing lever, the other end of which is operated with a micrometer. The knife edge contact provides a substantially linear motion so that calibrated readings may be obtained directly from the micrometer.

Accordingly a principal object of the invention is to provide new and improved angle measuring means.

Another object of the invention is to provide new and improved collimating testing means.

Another object of the invention is to provide new and improved optical testing means.

Another object of the invention is to provide new and improved means for measuring very small angles optically and with great accuracy.

Another object of the invention is to provide new and improved means for reading small angles with a direct micrometer reading of one micrometer division per 1/10 second of angle.

Another object of the invention is to provide new and improved collimating means which is small, portable and light weight for easy handling in laboratory and field use.

Figure 4:
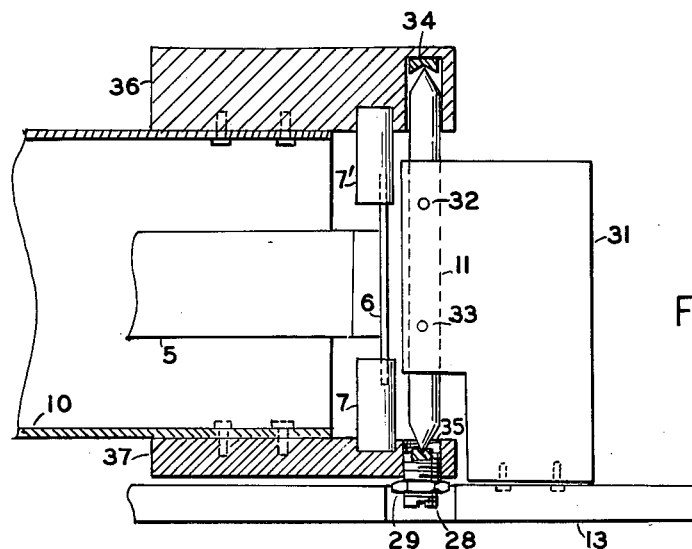
Figure 5:
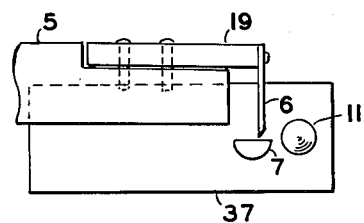
Figure 6:
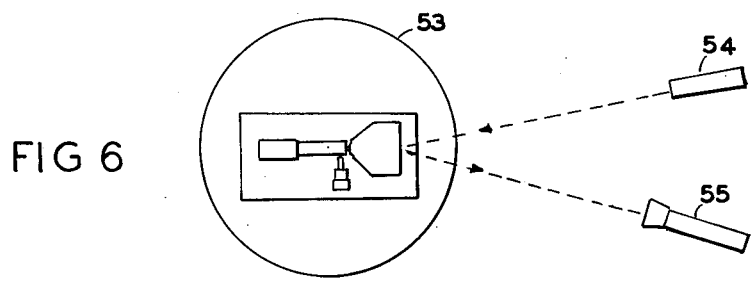

These and other objects of the invention will be apparent from the following specification and drawings of which FIG. 1 is a top view of an embodiment of the invention, FIG. 2 is a side view partially in section, and with parts omitted, of the embodiment of FIG. 1, FIG. 3 is a diagram illustrative of the operation of the invention, FIGS. 4 and 5 are detail views of the embodiment of FIGS. 1 and 2, and FIG. 6 is a diagram illustrative of the use of the invention.

Referring to the figures the invention generally comprises a 90° prism P which is mounted for horizontal angular rotation about pivot shaft 2. The prism is adapted to receive and reflect optically parallel rays 3 and 4. A long horizontal bar 5 is fixedly connected to the prism, for angularly rotating the prism about the pivot shaft 2. The bar 5 terminates in a knife edge 6 which bears against bearing blocks 7, 7' as urged by the spring 8. The bearing blocks 7, 7' are connected to the outside or hollow lever 10 which is mounted on stationary vertical shaft 11 for horizontal angular rotation. The lever 10 is adapted to be rotated by means of the micrometer 12. The pivot shaft 2 is mounted on the base 13 and the prism is mounted thereon by means of precision bearings. The other pivot shaft similarly supports lever 10 by means of precision needle bearings.

More specifically, the lever 10 is a hollow member inside which the bar 5 is located. The micrometer is mounted on the base 13 by means of the bracket 20 and bears against the ball contact 21 mounted in the holding bracket 22 connected to the lever 10. The spring 8 connected to the center bar 5 extends through an aperture in the member 10 and is anchored to a post 23 mounted on the base 13. A bubble type level 24 is also mounted on the base 13. Suitable leveling screws 16, 17, 18 are connected to base 13. Adjustable clamping brackets 25 and 26 are mounted on the base 13 by means of the screw 27. They are shown in storage position, namely, clamped against the prism mounting 41 and the hollow lever member 10 to prevent damage to the instrument while being transported.

The prism P mounting is as follows:

The shaft 2 is fixedly connected to the base 13 with nuts 38, 39. The block 41 which may be a solid casting is rotatably mounted on the shaft 2 by means of the bearings 42, 43. The long lever 5 is mounted in a hole in the block 41 and secured there by means of the set screw 44 bearing on the flat portion 45 of the lever bar 5. The length of the lever bar 5 is adjusted by loosening set screw 44, moving the bar lengthwise and then clamping with set screw 44. The bar 5 is preferably made of Invar steel alloy. The knife edge is screw mounted on the bar 5 by means of block 19, so that the knife edge is on the center axis of prism P. The knife edge 6 and the block 7 which it bears against are also preferably made of tool steel.

The prism P may be a conventional constant deviation prism of the type known as a Porro prism. It is mounted in the block casting 41 by means of a pair of holding brackets 49, 50 and is adjusted in the holding block by means of the adjustment screws 51, 52.

Screw 51 spring loads a pad 51', and screw 52 bears on pad 52' and is locked by lock nut 52a.

The lever 10 assembly is as follows:

The shaft 11 is fixedly mounted on the block 31 by means of the set screws 32, 33, the block 31 being fixedly connected to the base 13. The shaft 11 is made of tool steel with needle points on the ends. The outside lever 10 is mounted on the shaft 11 with a pair of needle bearings 34, 35 which are mounted in the support blocks 36, 37 which are fixedly connected to the outside hollow lever 10. More specifically, the lower needle bearing 35 is mounted in an adjustment screw 28 which is threaded into the block 37 and the adjustment is locked by means of the lock nut 29. The bearing block 7 is fixedly mounted on the block 37 and bearing block 7' is fixedly mounted on the block 36.

The operation of the device is as follows:

The knife edge 6 is held against the bearing blocks 7, 7' with a point contact by means of the spring 8. If the micrometer is turned it will cause the lever 10 to rotate about the pivot 11 which will also cause movement of the bearing blocks 7, 7' and the knife edge 6 which in turn will cause the prism to rotate about the pivot shaft 2. The motion of the micrometer is reduced by the ratio of X/Y (FIG. 3) and since the contact of the knife edge for small angles is essentially a point contact the angle of lever 10 about the pivot shaft 11 has a definite linear relation to the angle of the bar 5 and prism P about the pivot shaft 2. Therefore, the readings of the micrometer 12 may be very accurately calibrated.

In one embodiment of the present invention the overall length of the instrument was about 20″ and the width about 10″. The maximum angular displacement was 16.7 minutes. The prism was a 6″ x 3″ (90°—45°—45°) Porro type, the weight was approximately 30 lbs., the accuracy was .25 seconds of angle R.M.S. and each division of the micrometer was .1 second of angle.

In operation, to measure a desired angle, the apparatus is set up with a point source of light coming from the test piece. The apparatus is then adjusted so that for a first setting on the micrometer the direct and reflected rays are at some predetermined angle. For instance, referring to FIG. 6 the problem is to measure or check an angle of a precision rotating table 53. The present invention is set on the table as shown. A point source of light is provided by the collimator 54 and the reflection is read by the telescope 55. The setup is initially aligned so that the image of the collimator appears at the cross hairs of the telescope. The rotating table is then rotated a desirable angle and the angle is measured by the motion of the prism as read on the micrometer, required to bring back the collimator dot or image to the cross hairs of the telescope.

Many other ways of using the present invention will occur to those having particular problems, the number of applications being limited only by the number of problems.

Many modifications may be made by those who desire to practice the invention without departing from the scope thereof which is outlined by the following claim.

I claim:

Optical angle measuring means comprising a 90° prism adapted to receive and reflect optically parallel rays, means to mount said prism for horizontal angular motion about a vertical axis and means to measure said horizontal angular motion comprising a horizontal bar long in relation to the size of said prism fixedly connected to said prism for angular horizontal rotation and extending rearwardly from said prism along the center axis thereof, a vertical knife edge connected to the end of said bar, a hollow lever enclosing said bar and symmetrically related to the neutral axis of said bar and pivoted for horizontal angular motion at a point on the center line of said bar when said bar is centered, said point being slightly further from said prism than said knife edge, a bearing block mounted on said lever adjacent said lever pivot point, spring means causing said knife edge to bear against said bearing block and a micrometer connected to said hollow lever adjacent the other end thereof and adapted to actuate said lever in a horizontal angular motion.

References Cited in the file of this patent

UNITED STATES PATENTS

| | | |
|---|---|---|
| 2,706,253 | Hutchins et al. | Apr. 12, 1955 |

FOREIGN PATENTS

| | | |
|---|---|---|
| 555 | Great Britain | 1857 |
| 2,359 | Germany | 1878 |